(12) United States Patent
Kweon et al.

(10) Patent No.: US 7,061,545 B1
(45) Date of Patent: Jun. 13, 2006

(54) METHOD FOR DISPLAYING MENU OF TV

(75) Inventors: Hyek Seong Kweon, Taegu-shi (KR); Kwang Cheol Joo, Kyongsangbuk-do (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/475,135

(22) Filed: Dec. 30, 1999

(30) Foreign Application Priority Data

Dec. 31, 1998 (KR) .................................. 98-62839

(51) Int. Cl.
*H04N 5/50* (2006.01)
*H04N 5/445* (2006.01)

(52) U.S. Cl. ...................... 348/569; 348/563; 348/588; 348/589; 348/600; 715/763

(58) Field of Classification Search ........ 348/563–569, 348/580–584, 588–589, 599–600, 714–716, 348/561; 345/800, 801; 725/44, 47, 39; 715/763, 810; H04N 5/50, 5/445
See application file for complete search history.

(56) References Cited

U.S. PATENT DOCUMENTS

| | | | | |
|---|---|---|---|---|
| 5,528,304 | A | * | 6/1996 | Cherrick et al. ............. 348/563 |
| 5,594,509 | A | * | 1/1997 | Florin et al. ................. 348/565 |
| 5,623,316 | A | * | 4/1997 | Naito et al. .................. 348/511 |
| 5,671,378 | A | * | 9/1997 | Acker et al. ................. 345/801 |
| 5,767,919 | A | * | 6/1998 | Lee et al. .................... 345/157 |
| 5,831,591 | A | * | 11/1998 | Suh ............................. 345/1.1 |
| 5,923,379 | A | * | 7/1999 | Patterson ...................... 725/70 |
| 5,929,932 | A | * | 7/1999 | Otsuki et al. ................ 348/569 |
| 5,969,769 | A | * | 10/1999 | Hamadate .................... 348/563 |
| 5,990,940 | A | * | 11/1999 | Hashimoto et al. .......... 348/184 |
| 6,064,376 | A | * | 5/2000 | Berezowski et al. ......... 345/716 |
| 6,075,575 | A | * | 6/2000 | Schein et al. ................ 345/684 |
| 6,128,009 | A | * | 10/2000 | Ohkura et al. ................. 725/46 |
| 6,133,913 | A | * | 10/2000 | White et al. ................. 345/719 |
| 6,141,003 | A | * | 10/2000 | Chor et al. .................. 345/719 |
| 6,179,487 | B1 | * | 1/2001 | Bardon et al. ............... 715/841 |
| 6,181,335 | B1 | * | 1/2001 | Hendricks et al. ........... 345/723 |
| 6,263,501 | B1 | * | 7/2001 | Schein et al. .................. 725/39 |
| 6,367,080 | B1 | * | 4/2002 | Enomoto et al. ............. 348/564 |
| 6,411,337 | B1 | * | 6/2002 | Cove et al. ................... 348/563 |
| 6,442,755 | B1 | * | 8/2002 | Lemmons et al. ............. 725/47 |
| 6,587,602 | B1 | * | 7/2003 | Wakisawa et al. ........... 382/298 |
| 6,678,006 | B1 | * | 1/2004 | Velez et al. .................. 348/564 |

(Continued)

FOREIGN PATENT DOCUMENTS

JP          63195727       *  8/1988

*Primary Examiner*—Brian P. Yenke
(74) *Attorney, Agent, or Firm*—Birch, Stewart, Kolasch & Birch, LLP (57) ABSTRACT

A method for displaying a menu of a TV is disclosed, in which icons and characters are prevented, to the utmost, from being transformed in a screen mode having a variable width, such as a double window mode or a PIP mode, so that meanings of the icons and characters can correctly be discriminated by a user. The method for displaying a menu of a TV includes the steps of selecting a display mode of a TV screen, dividing a display area of the TV screen in accordance with a user's selection, determining a menu display area for displaying a menu element of the TV, and varying the size of the element having a default size in accordance with the size of the menu display area.

26 Claims, 7 Drawing Sheets

U.S. PATENT DOCUMENTS

| | | | |
|---|---|---|---|
| 6,678,007 B1* | 1/2004 | Nason et al. | 348/564 |
| 6,700,625 B1* | 3/2004 | Fujii | 348/588 |
| 6,792,197 B1* | 9/2004 | Helmstetter | 386/83 |
| 6,798,420 B1* | 9/2004 | Xie | 345/554 |
| 6,807,677 B1* | 10/2004 | Lee | 725/58 |
| 6,876,397 B1* | 4/2005 | Funakoshi et al. | 348/569 |
| 6,957,386 B1* | 10/2005 | Nishina et al. | 715/716 |
| 2002/0021308 A1* | 2/2002 | White et al. | 345/800 |
| 2002/0054136 A1* | 5/2002 | Andrew et al. | 345/800 |
| 2003/0051243 A1* | 3/2003 | Lemmons et al. | 725/44 |
| 2004/0261108 A1* | 12/2004 | Yuen et al. | 725/58 |
| 2005/0193337 A1* | 9/2005 | Noguchi et al. | 715/542 |

* cited by examiner

METHOD FOR DISPLAYING MENU OF TV

BACKGROUND OF THE INVENTION

1. Field of the Invention

The present invention relates to a TV, and more particularly, to a method for displaying an electronic program guide (EPG) menu of a TV.

2. Background of the Related Art

Figure 1:
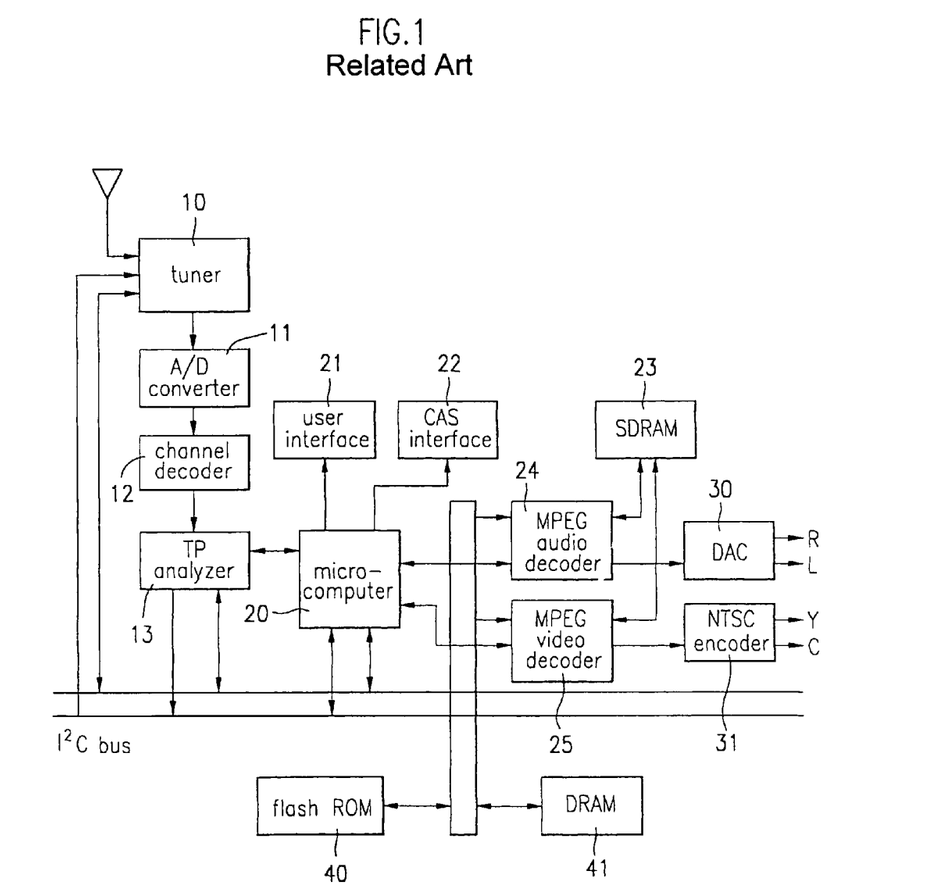
FIG. 1 is a schematic block diagram showing a general digital TV.

Generally, a digital TV receiver, as shown in FIG. 1, includes: a tuner 10 which receives a broadcasting signal; an A/D converter 11 for converting the broadcasting signal received from the tuner 10 into digital broadcasting data; a channel decoder 12 for detecting a pilot signal from the digital broadcasting data to detect a baseband signal and for performing an error correction for the detected signal; a microcomputer 20 for outputting a control signal in accordance with manipulation of a user; a TP analyzer 13 for analyzing a TP signal in the digital broadcasting signal output from the A/D converter 11 to detect audio/video signals under the control of the microcomputer 20; an MPEG audio decoder 24 for decoding the audio signal analyzed in the TP analyzer 13; an MPEG video decoder 25 for decoding the video signal analyzed in the TP analyzer 13; a digital to analog converter (DAC) 30 for converting the digital audio signal decoded by the MPEG audio decoder 24 into an analog signal; a flash ROM (read only memory) 40 where channels and programs are stored; a RAM 41 where temporary data is stored by the operation of the microcomputer 20; and an NTSC encoder 31 for converting the video signal decoded by the MPEG video decoder 25 into an image signal which is displayed on a TV or monitor. Further, an SDRAM 23 is necessary for data processing in the MPEG audio decoder 24 and the MPEG video decoder 25, and a user interface 21 and a CAS interface 22 are necessary for generating an external operation signal for the microcomputer 20.

Generally, the digital broadcasting processes the video signal and the audio signal under the MPEG standard. Particularly, the MPEG standard number for the broadcasting system is ISO/IEC 13818-1, the standard for the video signal is ISO/IEC 13818-2, and the standard for the audio signal is ISO/IEC 13818-3. However, the digital TV receiver in the U.S.A. does not use the audio signal under the MPEG system, and processes it under the standard of DOLBY AC-3.

The tuner 10 receives a Quadrature Phase Shift Keying (QPSK) signal or a Quadrature Amplitude Modulation (QAM) signal from an antenna, and detects and outputs the received signal. The detected signal in the tuner 10 is converted into an intermediate frequency band signal by means of an IF converter (not shown). This is because the detected signal in the tuner 10 is a high frequency signal in a great high frequency band, with which a driving circuit in the digital TV does not deal.

The channel decoder 12 detects the pilot signal in the intermediate frequency signal to detect the baseband signal and converts the baseband signal into a digital signal. Next, it performs a timing recovery corresponding to symbol rate and then performs the error correction. The output signal of the channel decoder 12 is a transport stream packet type signal sequence in a byte unit.

The transport signal sequence, which is standardized in the MPEG-2 system, is a time-multiplexed signal sequence, which is called "transport stream packet". The transport signal sequence contains a header on which a packet identifier (PID) number is recorded, on the starting of the packet. The PID number is utilized as the information with which the time-multiplexed signal is demultiplexed. Also, the PID number indicates the type of current packet, and if the PID number is analyzed, it is detected whether the current packet is a video packet, an audio packet, or program specific information. Particularly, the digital TV standard in the U.S.A. includes program specific information, that is, program and system information protocol (hereinafter, referred to as 'PSIP').

The PSIP includes a master guide table (MGT) where the versions of all the broadcasting program tables are controlled, a terrestrial virtual channel table (TVCT) where the information for channels is stored, a rating region table (RRT) where a rating table of each program is listed, an event information table (EIT) for providing the information on the current broadcasting programs and future broadcasting programs, an extended text table (ETT) for providing detailed information on the current broadcasting programs and future broadcasting programs, and a system time table (STT) for sending current time.

The video and audio standards in the MPEG-2 system are in connection with the signal sequences of the compressed video and audio. Under the MPEG-2 standard, the video signal, the audio signal and the program specific information are all time-multiplexed and transmitted in several transport stream packets. The signal sequences thereof are all discriminated with the PID number.

The TP analyzer 13 analyzes the signal sequence in the transport stream packet with the PID number and applies the analyzed results to each decoders 24 and 25. In more detail, the TP analyzer 13 receives the transport signal sequence received in the tuner 10 and senses the PID number contained on the header of the corresponding signal sequence. Thus, the TP analyzer 13 performs demultiplexing through which the received transport signal sequence is divided into a video signal sequence, an audio signal sequence and a program specific information sequence in accordance with the sensed PID number. Thereby, the TP analyzer 13 applies the video signal sequence to the MPEG video decoder 25, the audio signal sequence to the MPEG audio decoder 24, and the program specific information sequence to the microcomputer 20.

The MPEG video decoder 25 decodes the video signal sequence applied from the TP analyzer 13 and outputs the decoded result to the NTSC encoder 31. The video signal sequence applied from the TP analyzer 13 is the compressed data in the MPEG-2 system. Therefore, the MPEG video decoder 25 decompresses the video signal sequence to restore it to original digital video data.

The MPEG audio decoder 24 decodes the audio signal sequence applied from the TP analyzer 13 and outputs the decoded result to the DAC 30. The audio signal sequence applied from the TP analyzer 13 is the compressed data in the MPEG-1 system. Therefore, the MPEG audio decoder 24 decompresses the audio signal sequence to restore it to original digital audio data.

The DAC 30 converts the digital audio signal applied from the MPEG audio decoder 24 into analog audio signals (R and L) which are processed in an amplifier or speaker. The analog audio signal is output as voice or sound by means of a stereo speaker (not shown).

The NTSC encoder 31 converts the digital video signal applied from the MPEG video decoder 25 into luminance and chrominance signals (Y and C) which are displayed on a general TV or monitor. The luminance and chrominance signals are displayed as video by means of a CRT (not shown).

The microcomputer 20 controls the operation of the digital TV receiver. The flash ROM 40 stores the program necessary for the control of the microcomputer 20, and the DRAM 41 stores the temporary information or data necessary upon the execution of the control operation of the microcomputer 20.

The aforementioned digital TV receives the program specific information signal sequence to provide various kinds of interactive program specific information other than broadcasting programs to a viewer. Such interactive program specific information contain home shopping, newspapers, stock information and so on, which are not obtained in an analog TV. The program specific information signal sequence is a transport stream packet type.

The program specific information system of the TV provides a graphic user interface (GUI) to the viewer for convenient use of the program specific information.

Figure 2:
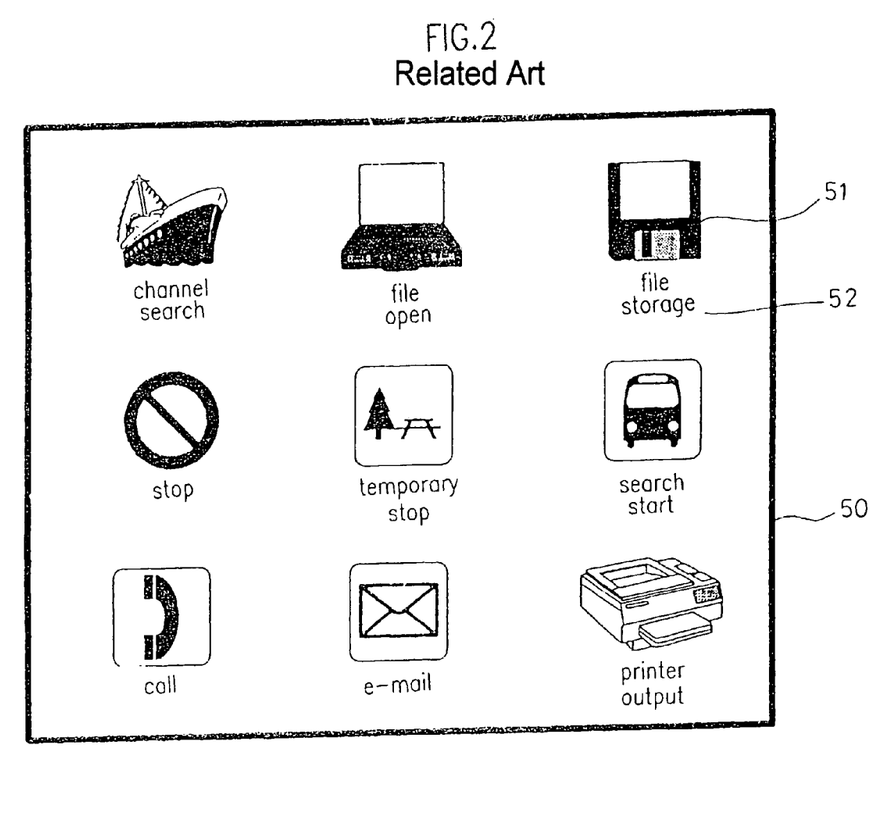
FIG. 2 shows a GUI screen of a general digital TV.

FIG. 2 shows an electronic program guide (EPG) of the program specific information of the GUI type. Referring to FIG. 2, a menu screen 50 includes icons 51 and characters 52 explaining the icons. Most programmers who produce an EPG, produce a menu based on a full screen as shown in FIG. 2.

However, the EPG of the related art digital TV has several problems.

Figure 3:
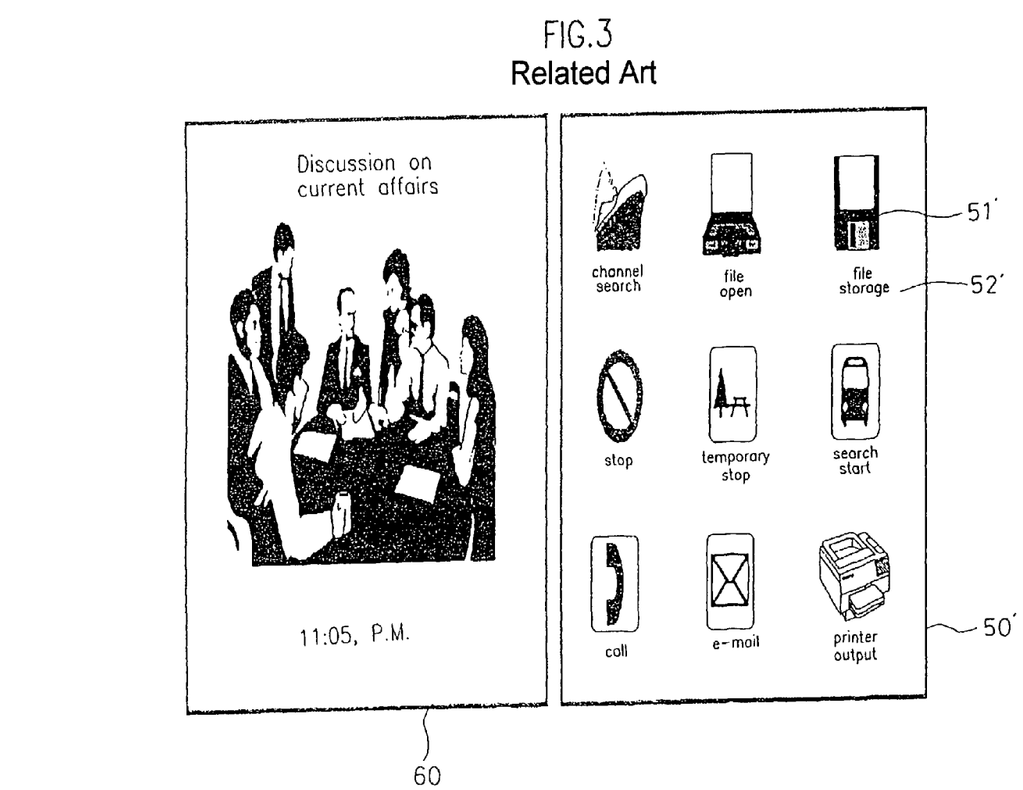
FIG. 3 shows a screen for displaying a TV menu and broadcasting programs in a double window mode.

Referring to FIG. 3, in the EPG displayed in the related art digital TV, when the viewer selects a double window mode for simultaneously displaying a broadcasting program screen 60 and an EPG screen 50', a width of the EPG program screen 50' becomes smaller. As a result, widths of the characters and icons become smaller, thereby causing the viewer difficulty in discriminating the characters 52' and icons 51'.

Figure 4:
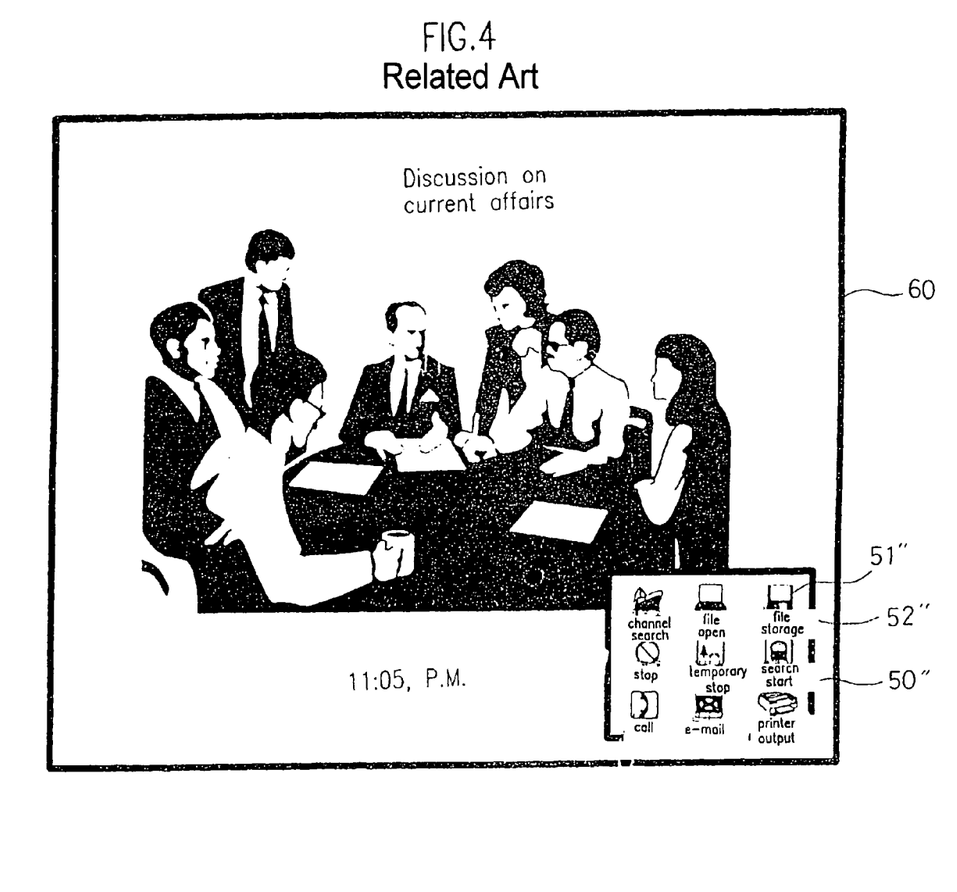
FIG. 4 shows a screen for displaying a TV menu and broadcasting program in a PIP mode.

Furthermore, if the icons are displayed with a menu window 50' of a picture in picture (PIP) mode as shown in FIG. 4, characters 52" and icons 51" have smaller widths and lengths, thereby making it difficult for the viewer to discriminate meanings of the characters and icons. Particularly, it is difficult to discriminate meanings of the characters seriously scaled down in their size while meaning of the icons may be discriminated by the viewer to some extent regardless of the double window mode and the PIP mode.

SUMMARY OF THE INVENTION

Accordingly, the present invention is directed to a method for displaying a menu of a TV, that substantially obviates one or more of the problems due to limitations and disadvantages of the related art.

An object of the present invention is to provide a method for displaying a menu of a TV in which icons and characters are prevented, to the utmost, from being transformed in a screen mode having a variable width, such as a double window mode or a PIP mode, so that meanings of the icons and characters can correctly be discriminated by a user.

Other object of the present invention is to provide a method for displaying a menu of a TV in which icons and characters are displayed by adjusting lengths and widths thereof in accordance with the size of the menu.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a method for displaying a menu of a TV according to the present invention includes the steps of determining whether or not a menu key is input, determining a current screen display mode if the menu key is input, and displaying a menu element in a menu display area depending on the screen display mode.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

In the present invention, the size of each menu element is variably displayed in accordance with a display mode of a TV, selected by a user.

Figure 5:
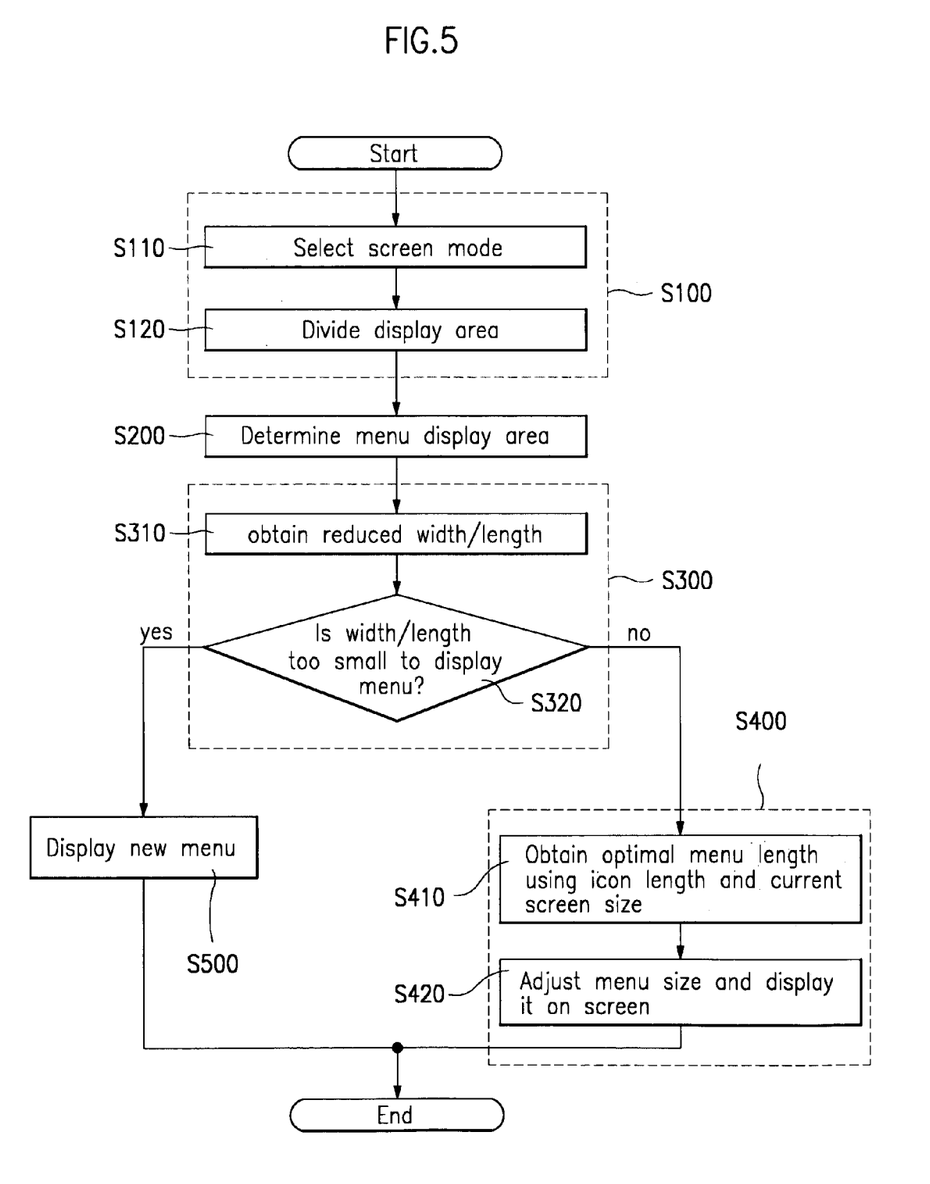
FIG. 5 is a flow chart showing a method for displaying a TV menu according to the present invention.

FIG. 5 is a flow chart showing a method for displaying a TV menu according to the present invention.

In step S100, if a user inputs a menu key to select a screen mode of a TV, the TV of the present invention determines the current screen display mode and divides a display area of the screen in accordance with the screen mode selected by the user. In the present invention, the menu element is displayed on a menu display area which is set to display a menu in the divided display area of the screen.

If the current screen display mode is a mode which displays a plurality of screens, the menu is displayed on a default screen. At this time, the menu is displayed by adjusting the size of the menu element in accordance with the size of the screen on which the menu is displayed. In general, if area ratio between a region on which the menu is to be displayed and a region in which the menu is occupied is less than 100%, the size of the menu element may preferably be reduced according to area ratio. In this case, the menu element whose size is adjusted may be either characters included in the menu, or icons.

The operation of the TV according to the present invention depends on screen display modes.

The operation of the TV in case of a double window mode will be described below.

If the user selects a screen mode of the TV as a double window mode in step S110, the display area of the TV is divided into a first screen and a second screen having almost the same size in step S120.

If the display area of the TV is divided, either the first screen or the second screen is determined as a menu display area in step S200. At this time, in the present invention, the screen selected by the user as having higher priority order is determined as the menu display area.

If the menu display area is determined, the size of each element constituting menus is varied. Each element has a default size by means of a program of a manufacturer. In the present invention, in step S310, the size of an element is obtained so as to display each element constituting menus on the menu display area. If each element of the menu can be displayed on the determined menu display area even though each element is displayed by the default size, the menu is displayed without separately adjusting the size of the element.

Figure 6:
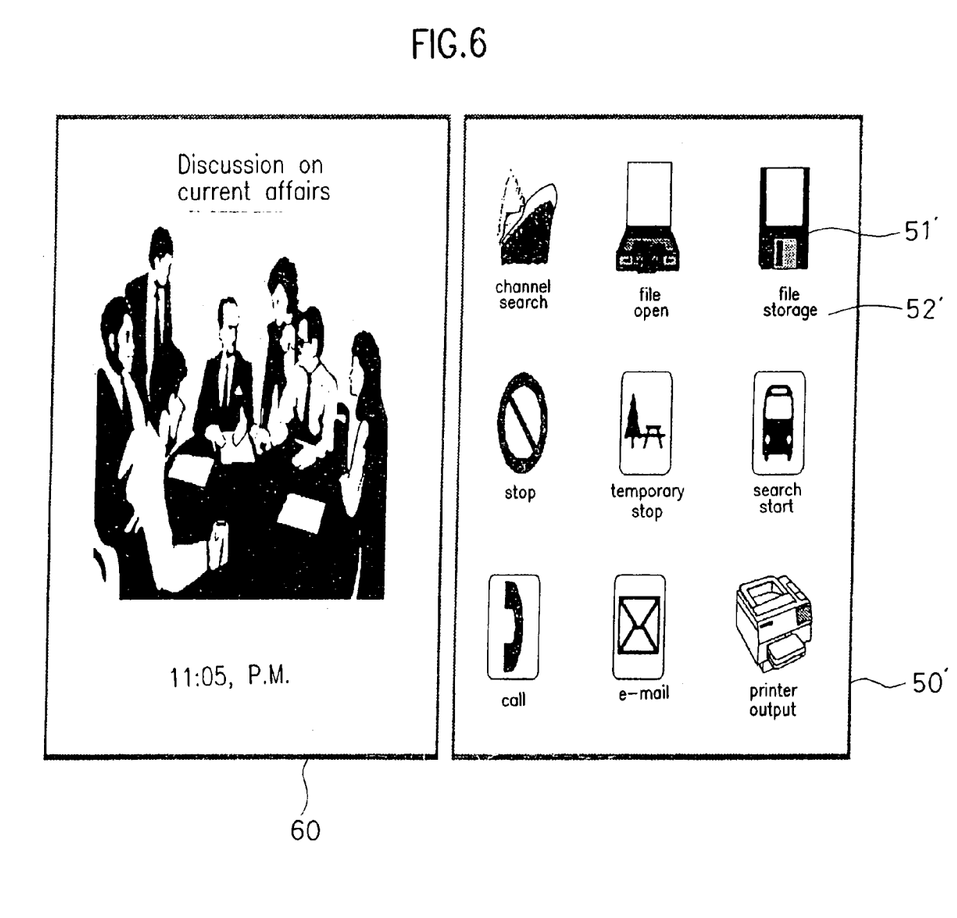
FIG. 6 shows a screen for displaying a TV menu and broadcasting program in a double window mode according to the present invention.

However, when each element is displayed by the default size, if the determined menu display area is too narrow to display each element in step S320, as shown in FIG. 6, the size of each element is reduced and displayed on the screen to display each element of the menu on the menu display area in step S410 and S420. At this time, in the present invention, the size of characters showing each element of the menu is reduced, the size of icons showing each element is reduced, or the sizes of both characters and icons are reduced.

If discrimination is reduced as the size of the reduced characters is seriously smaller than the default size, it is difficult for the viewer to discriminate the elements of the menu. To avoid this, the size of the reduced characters is again expanded to the size which is to be discriminated by the viewer. The expansion rate of the reduced characters is set at a value less than a reciprocal number of the reduction rate of characters. For example, if the size of the characters has been reduced at a size of 50% (½) of the default size, the expansion rate is set at a reciprocal number of 50%, i.e., 2 or less. That is, if it is difficult to discriminate characters as the size of the reduced characters is reduced at the size of 50% of the default size, the size of the reduced characters is again expanded at a size less than double size. After all, in step S500, the characters of the menu are displayed at a size less than the original size, i.e., the default size.

The operation of the TV in case of a multi-window mode will be described below.

If the user selects a screen mode of the TV as a multi-window mode in step S110, the display area of the TV is divided into four small screens or more. At this time, the display area of the TV may be divided into either four small screens having the almost same size or nine small screens having the almost same size in step S120.

If the display area of the TV is divided into four small screens or nine small screens, any one of the small screens is determined as a menu display area in step S200. Particularly, in the present invention, the screen selected by the user as having higher priority order is determined as the menu display area. At this time, the screen having higher priority order may be either a small screen located at the corner or a small screen located at the center among the small screens. If the display area of the TV is divided into nine small screens arranged in matrix arrangements, either a corner display area located at the corner or a center display area located at the center may be set as the menu display area.

If the menu display area is determined, the size of each element constituting menu is varied. Each element has a default size by means of a program of a manufacturer. In the present invention, in step S310, the size of the element is obtained so as to display each element on the menu display area. If each element of the menu can be displayed on the menu display area even though each element is displayed by the default size, the menu is displayed without separately adjusting the size of the element.

However, when each element is displayed by the default size, if the determined menu display area is too narrow to display each element in step S320, the size of each element is reduced and displayed on the screen to display each element of the menu on the menu display area in step S410 and S420. At this time, in the present invention, the size of characters showing each element of the menu is reduced, the size of icons showing each element is reduced, or the sizes of both characters and icons are reduced.

If discrimination is reduced as the size of the reduced characters is seriously smaller than the default size, it is difficult for the viewer to discriminate the elements of the menu. To avoid this, the size of the reduced characters is again expanded to the size which is to be discriminated by the viewer. The expansion rate of the reduced characters is set at a value less than a reciprocal number of the reduction rate of characters. For example, if the size of the characters has been reduced at a size of 25% (¼) of the default size, the expansion rate is set at a reciprocal number of 25%, i.e., 4 or less. That is, if it is difficult to discriminate characters as the size of the reduced characters is reduced at the size of 25% of the default size, the size of the reduced characters is again expanded at a size less than quadruple size. After all, characters of the menu are displayed at a size less than the original size, i.e., the default size.

If the characters of the menu are maintained at the original size at the state that the menu display area is reduced at 25% of the display area of the TV, all of the characters may not be displayed on the menu display area. Particularly, if the width of the character of the menu is reduced less than 50% (½) of the original width thereof, respective elements of the menu may overlap each other. In that case, in the present invention, all of the characters of the selected element are not displayed, but some menu is displayed with maintaining the size of the character at a size to be discriminated by the viewer. Also, in step S500 of the present invention, a menu of a new size is displayed by manipulating a key of the TV so that each element of the menu is scrolled on the menu display area.

The operation of the TV in case of a PIP mode will be described below.

If the user selects a screen mode of the TV as a PIP mode in step S110, the display area of the TV is divided into a main display area having the size of the entire display area and a sub display area overlapping some of the main display area in step S120.

If the display area of the TV is divided into the main display area and the sub display area, any one of the main display area and the sub display area is determined as a menu display area in step S200. At this time, the screen selected by the user as having higher priority order is determined as the menu display area. In general, the user is likely to display the menu on the sub display area smaller than the main display area.

If the sub display area is determined as the menu display area, the size of the element is obtained so as to display each element on the sub display area in step S310. If each element of the menu can be displayed on the sub display area even though each element is displayed by the default size in step S320, the menu is displayed without separately adjusting the size of the element.

However, when each element is displayed by the default size, if the determined sub display area is too narrow to display each element in step S320, the size of each element is reduced and displayed on the screen to display each element of the menu on the sub display area in steps S410 and S420. At this time, in the present invention, the size of characters showing each element of the menu is reduced, the size of icons showing each element is reduced, or the sizes of both characters and icons are reduced.

Figure 7:
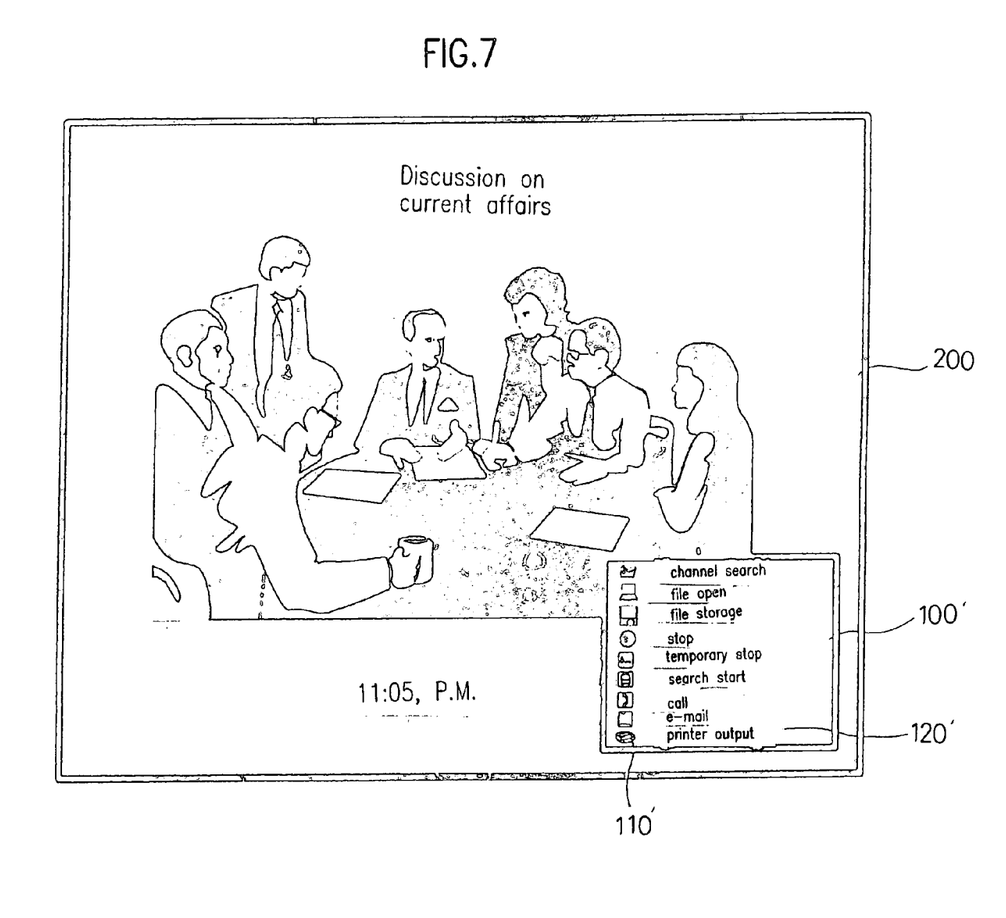
FIG. 7 shows a screen for displaying a TV menu and broadcasting program in a PIP mode according to the present invention.

If the characters of the menu are maintained at the original size at the state that the menu display area is reduced at 25% of the display area of the TV, all the characters may not be displayed on the menu display area. Particularly, if the width of the character of the menu is reduced less than 50% (½) of the original width thereof, respective elements of the menu may overlap each other. In that case, in the present invention, all the characters of the selected element are not displayed, but some menu is displayed with maintaining the size of the character at a size to be discriminated by the viewer. Also, in step S500, a menu of a new size as shown in FIG. 7 is displayed by manipulating a key of the TV so that each element of the menu is scrolled in the menu display area.

As aforementioned, the method for displaying a menu of a TV according to the present invention has the following advantages.

Unlike the related art method for displaying a menu of a TV, meanings of icons or characters of the menu can be discriminated by the viewer even though the screen display mode of the TV is varied. In other words, in the present invention, the screen display mode of the TV is varied to the double window mode or the PIP mode by key manipulation of the user so that meanings of the selected element containing icons and characters can be discriminated by the viewer even though the size of the icon and characters of the menu is reduced. Accordingly, it is possible to properly provide specific information services of a TV broadcasting program to the viewer.

It will be apparent to those skilled in the art that various modifications and variations can be made in the method for displaying a menu of a TV according to the present invention without departing from the spirit or scope of the invention. Thus, it is intended that the present invention covers the modifications and variations of the invention provided they come within the scope of the appended claims and their equivalents.

What is claimed is:

1. A method for displaying a menu of a TV the method comprising the steps of:
    setting a screen display mode to simultaneously display two or more screens on a TV, at least one screen displaying the menu;
    automatically sizing displayed elements, including an interactive menu element, to a size proportionate with the size of said two or more screens;
    determining whether or not a menu key is input to display interactive program specific information including broadcasting program information;
    determining which screen display mode is the current screen display mode if it is determined that said menu key is input;
    displaying each interactive menu element including an icon in the menu display screen depending on the screen display mode if all elements of the menu can be displayed on the determined display area in a default size without separately adjusting the size of an interactive menu element;
    automatically reducing the size of said menu elements to a size other than a default size in accordance with the size of the screen on which the menu is displayed, to permit said menu elements to be displayed on the determined display area if the determined area is too small to display all menu elements; and
    enlarging the reduced size menu elements by a factor that is less than a reciprocal number of the size reduction factor of the menu elements to display menu elements to be easily discriminated by a viewer on the display screen.

2. The method for displaying a menu of a TV as claimed in claim 1, wherein the step of displaying the menu element includes the step of displaying the menu on a default screen if the current screen display mode is a mode which displays a plurality of screens.

3. The method for displaying a menu of a TV as claimed in claim 2, wherein the screen display mode displays two screens.

4. The method for displaying a menu of a TV as claimed in claim 3, wherein the two screens include a main display area and a sub display area.

5. The method for displaying a menu of a TV as claimed in claim 3, wherein the screen display mode which displays the two screens is a double window screen display mode.

6. The method for displaying a menu of a TV as claimed in claim 2, wherein the screen display mode is a multi-window screen display mode.

7. The method for displaying a menu of a TV as claimed in claim 1, wherein the step of displaying the menu element includes the step of adjusting the size of the menu element in accordance with the size of the menu display screen.

8. The method of displaying a menu of a TV as claimed in claim 7, wherein the step of adjusting the size of the menu element includes the steps of obtaining a first ratio between a region on which the menu is to be displayed and a region in which the menu is occupied, and reducing the size of the menu at a predetermined ratio if said first ratio is less than 1 to 1.

9. The method for displaying a menu of a TV as claimed in claim 7, wherein the step of adjusting the size of the menu element includes the step of expanding or reducing the size of characters included in the menu element.

10. The method for displaying a menu of a TV as claimed in claim 7, wherein the step of adjusting the size of the menu element includes the step of expanding or reducing the size of icons included in the menu element.

11. The method of claim 1, further comprising arranging the menu screen to permit scrolling of a menu element.

12. A method for displaying a menu of a TV, the method comprising the steps of:
    setting a screen display mode to simultaneously display a plurality of screens on a TV;
    automatically sizing displayed elements, including an interactive menu element, in direct proportion to the sizes of said plurality of screens;
    setting one of the plurality of screens as an interactive menu display screen wherein a user may select program specific information from said menu, including broadcasting program information;

displaying each interactive menu element including said program specific information, including broadcasting information on the menu display screen if all elements of the menu can be displayed on the determined display area in a default size without separately adjusting the size of an interactive menu element;

automatically reducing the size of said interactive menu elements to a size other than a default size in accordance with the size of the screen on which the menu is displayed, to permit said menu elements to be displayed on the on the determined display area if the determined area is too small to display all menu elements; and enlarging the reduced size menu elements by a factor that is less than a reciprocal number of the size reduction factor of the menu elements to display menu elements that are easily discriminated by a viewer on the display screen.

13. The method for displaying a menu of a TV as claimed in claim 12, further comprising the step of adjusting the size of the menu in accordance with the size of the menu display screen.

14. The method of claim 11, further comprising arranging the menu screen to permit scrolling of a menu element.

15. A method of displaying a menu in a TV screen, comprising the steps of:
   displaying picture and display elements, including an icon, in proportion with a size of a display screen, depending on a screen display mode;
   determining whether a menu key is input by a user to display an interactive menu for program specific information including broadcasting program information on a TV screen;
   determining which display mode is the current display mode if said menu key is input;
   dividing said TV screen into two or more first sub-display screens or into a main-display screen and one or more second sub-display screens according to which mode is determined to be the current display mode;
   setting one of said first or second sub-display screens as an interactive menu-display screen;
   displaying each interactive menu element including an icon in the menu display screen depending on the screen display mode if all elements of the menu can be displayed on the determined display area in the default size without separately adjusting the size of an interactive menu element;
   automatically reducing the size of one or more interactive icons of said menu to a size other than a default size in accordance with the size of the screen on which the menu is displayed, to permit the interactive menu elements to be displayed on the determined display area if the determined area is too small to display all menu elements;
   enlarging the reduced size interactive menu elements by a factor that is less than a reciprocal number of the size reduction factor of the menu elements to display menu elements that are so as to be distinguishably recognizable by said user when displayed on said menu-display screen; and
   displaying the resized icons on said menu-display screen.

16. The method of claim 15, wherein said current display mode is any one of a double-window mode, a multi-window mode, and a Picture-In-Picture (PIP) mode.

17. The method of claim 15, wherein the automatically resizing step includes the steps of obtaining a first ratio between a region on which the menu is to be displayed and a region in which the menu is occupied, and reducing the size of the menu at a predetermined ratio if said first ratio is less than 100%.

18. The method of claim 15, wherein the automatically resizing step includes the step of expanding or reducing a size of a text portion being included in each of said icons.

19. The method of claim 15, wherein the automatically resizing step includes the step of expanding or reducing a size of a graphical portion being included in each of said icons.

20. The method of claim 15, further comprising arranging the menu screen to permit scrolling of a menu element.

21. A method of displaying a menu in a TV screen, comprising the steps of:
   determining whether a menu key is input by a user to display an interactive menu for program specific information including broadcasting information on a TV screen;
   determining which display mode is the current display mode if said menu key is input;
   dividing said TV screen into two or more first sub-display screens or into a main-display screen and one or more second sub-display screens according to which mode is determined to be the current display mode;
   setting one of said first or second sub-display screens as an interactive menu-display screen;
   displaying each interactive menu element including an icon in the menu display screen depending on the screen display mode if all elements of the menu can be displayed on the determined display area in a default size without separately adjusting the size of an interactive menu element;
   automatically sizing one or more interactive icons of the interactive menu to a first size other than a default size, the first size being proportionate with a size of the menu-display screen, to permit the interactive menu elements to be displayed on the determined display area if the determined area is too small to display all menu elements;
   automatically resizing the interactive icons to a new size based on a ratio between the first size and the size of the menu-display screen to permit said icon to be easily discriminated by a viewer; and
   displaying the automatically resized icons on said menu-display screen.

22. The method of claim 21, wherein said current display mode is any one of a double-window mode, a multi-window mode, and a Picture-in-Picture (PIP) mode.

23. The method of claim 21, wherein said automatically resizing step includes the step of expanding or reducing a size of a text portion being included in each of said interactive icons.

24. The method of claim 21, wherein said automatically resizing step includes the step of expanding or reducing a size of a graphical portion being included in each of said interactive icon.

25. The method of claim 21, further comprising arranging the menu screen to permit scrolling of a menu element.

26. A system for displaying a menu of a TV, the system comprising:
   means for setting a screen display mode to simultaneously display two or more screens on a TV, at least one screen displaying the menu;
   means for automatically sizing displayed elements, including an interactive menu element, to a size proportionate with the size of said two or more screens;

means for determining whether or not a menu key is input to display interactive program specific information including broadcasting program information;

means for determining which screen display mode is the current screen display mode if it is determined that said menu key is input;

means for displaying each interactive menu element including an icon in the menu display screen depending on the screen display mode if all elements of the menu can be displayed on the determined display area in a default size without separately adjusting the size of an interactive menu element;

means for automatically reducing the size of said menu elements to a size other than a default size in accordance with the size of the screen on which the menu is displayed, to permit said all of the menu elements to be displayed on the determined display area if the determined area is too small to display all menu elements; and means for enlarging the reduced size menu elements by a factor that is less than a reciprocal number of the size reduction factor of the menu elements to display menu elements that are easily discriminated by a viewer on the display screen.

* * * * *